United States Patent
Ikeda

(10) Patent No.: US 7,684,296 B2
(45) Date of Patent: Mar. 23, 2010

(54) INFORMATION RECORDING/REPRODUCING APPARATUS HAVING CONTROL CIRCUIT OF SPINDLE MOTOR

(75) Inventor: Shingo Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 874 days.

(21) Appl. No.: 11/477,488

(22) Filed: Jun. 30, 2006

(65) Prior Publication Data

US 2007/0008849 A1 Jan. 11, 2007

(30) Foreign Application Priority Data

Jul. 8, 2005 (JP) .............................. 2005-200134

(51) Int. Cl.
*G11B 19/24* (2006.01)
*G11B 7/00* (2006.01)

(52) U.S. Cl. ................ 369/47.4; 369/44.29; 369/47.45; 369/47.48; 369/53.3

(58) Field of Classification Search ... 369/44.25–44.29, 369/44.34–44.36, 47.28–47.3, 47.38–47.39, 369/47.41, 47.44–47.48, 53.12–53.13, 53.3–53.34
See application file for complete search history.

(56) References Cited

U.S. PATENT DOCUMENTS 5,784,346 A * 7/1998 Matsuo et al. ........... 369/47.47

| | | | | |
|---|---|---|---|---|
| 6,128,261 A * | 10/2000 | Suzuki | ..................... | 369/47.48 |
| 6,285,635 B1 | 9/2001 | Watanabe et al. | ......... | 369/44.27 |
| 6,493,304 B2 | 12/2002 | Watanabe et al. | ......... | 369/53.22 |
| 6,728,179 B1 * | 4/2004 | Nakano et al. | ............. | 369/53.1 |

FOREIGN PATENT DOCUMENTS

| JP | 7-311962 | 11/1995 |
|---|---|---|
| JP | 11-176073 | 7/1999 |

* cited by examiner

*Primary Examiner*—Andrea L Wellington
*Assistant Examiner*—Nathan Danielsen
(74) *Attorney, Agent, or Firm*—Fitzpatrick, Cella, Harper & Scinto

(57) ABSTRACT

There is provided an information recording/reproducing apparatus for recording or reproducing an information to or from an information recording medium having a plurality of recording layers stacked on a substrate which can always perform stable spindle rotation control irrespective of an error of a desired frequency value or the like, and which includes an optical head for recording or reproducing an information to or from the recording layers by use of an optical beam; a spindle motor for rotating the recording medium; and a drive voltage holding circuit for holding a drive voltage of the spindle motor when the optical head performs switching between the recording layers for recording/reproducing.

2 Claims, 8 Drawing Sheets

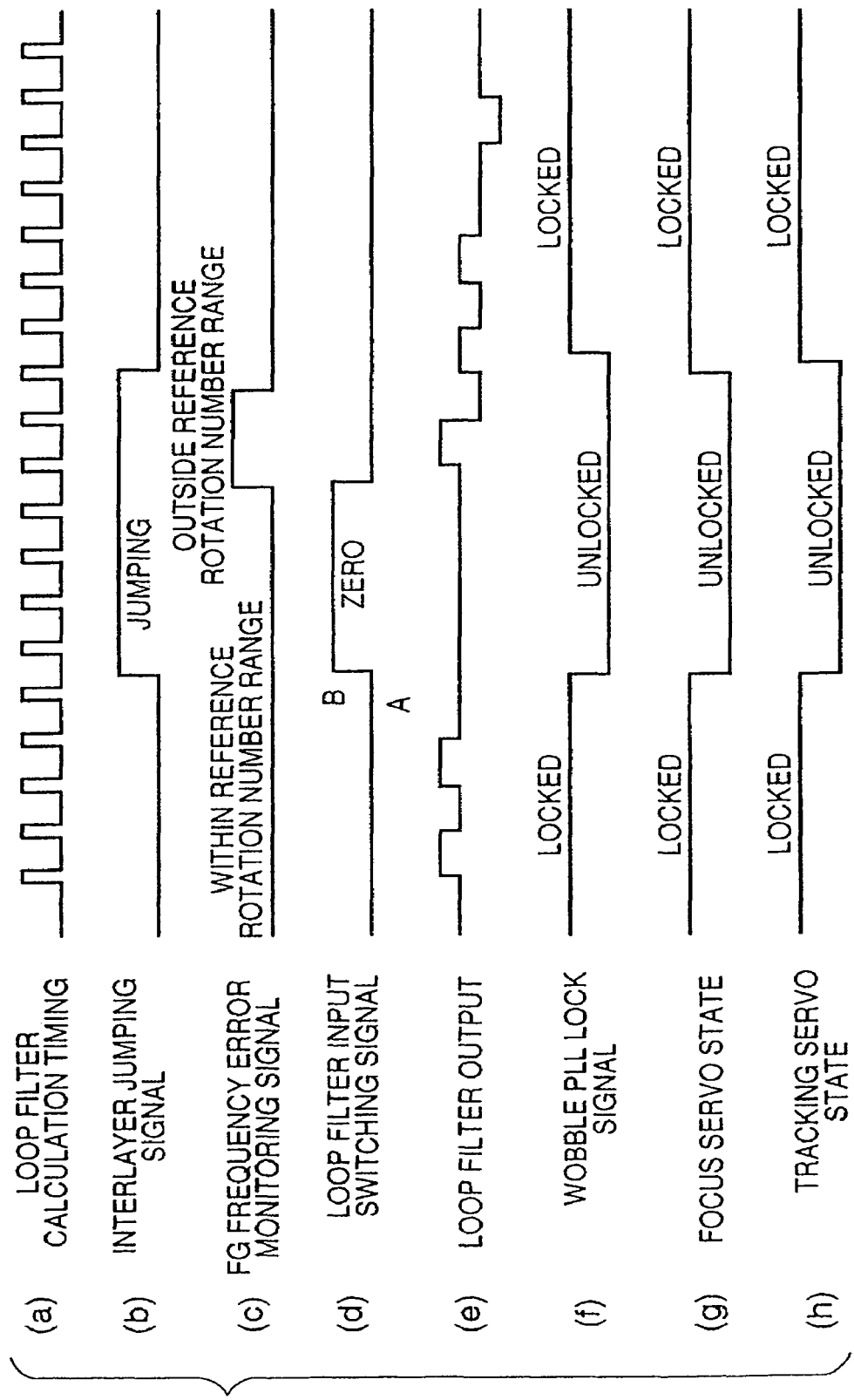

INFORMATION RECORDING/REPRODUCING APPARATUS HAVING CONTROL CIRCUIT OF SPINDLE MOTOR

BACKGROUND OF THE INVENTION

1. Field of the Invention

The present invention relates to an information recording/reproducing apparatus for recording an information on an information recording medium such as an optical disk or reproducing a recorded information therefrom. In particular, the present invention relates to a drive control of a spindle motor.

2. Related Background Art

Hitherto, there is known an optical disk on which a wobble for generating a clock is formed, and rotational control of a spindle motor with a wobble reproduced signal of a disk is described in, for example, Japanese Patent Application Laid-Open No. H07-311962.

Further, the rotational control of a spindle motor using a frequency generator (FG) means signal is generally performed as described in, for example, Japanese Patent Application Laid-Open No. H11-176073.

Here, in a case of performing the rotational control of a spindle motor, there can be used an FG output for providing an FG signal having a frequency proportional to the rotation number of the spindle motor, or an output of a wobble phase locked loop (PLL) means for generating a clock which is synchronous with the wobble formed on the optical disk from a reproduced signal. At this time, the rotational control of a spindle motor can be performed based on an output of the FG means in a case where a wobble PLL is in an unlocked state, and based on an output of a rotation number detection means in a case where the wobble PLL is in a locked state.

In the optical disk having a plurality of recording layers, in a case where an optical head changes a layer for recording or reproducing, the wobble PLL is in an unlocked state since a wobble signal cannot be reproduced, which makes it necessary to perform the rotational control of a spindle motor with the output of the FG means. However, at this time, in a case where there is an error in setting a desired FG frequency value for performing the rotational control of a spindle motor, there is posed the problem that the rotation of a spindle motor becomes unstable, and an excessive power is required for changing the rotation number.

SUMMARY OF THE INVENTION

It is, therefore, an object of the present invention to provide an information recording/reproducing apparatus capable of performing stable rotational control of a spindle motor.

According to the present invention, there is provided an information recording/reproducing apparatus for recording or reproducing an information to or from any information recording medium having a plurality of recording layers stacked on a substrate, which comprises an optical head for recording or reproducing an information to or from the recording layers by use of an optical beam; a spindle motor for rotating the recording medium; and a circuit for holding a drive voltage of the spindle motor when the optical head performs switching between the recording layers for recording/reproducing.

BRIEF DESCRIPTION OF THE DRAWINGS

FIG. 8 is a timing chart illustrating a control in the case where the rotation number of a spindle motor deviates considerably from the lock range of a wobble PLL during the interlayer jumping of the second embodiment.

DESCRIPTION OF THE PREFERRED EMBODIMENTS

Hereinafter, the present invention will be described in detail by way of best embodiments with reference to the drawings.

First Embodiment

Figure 1:
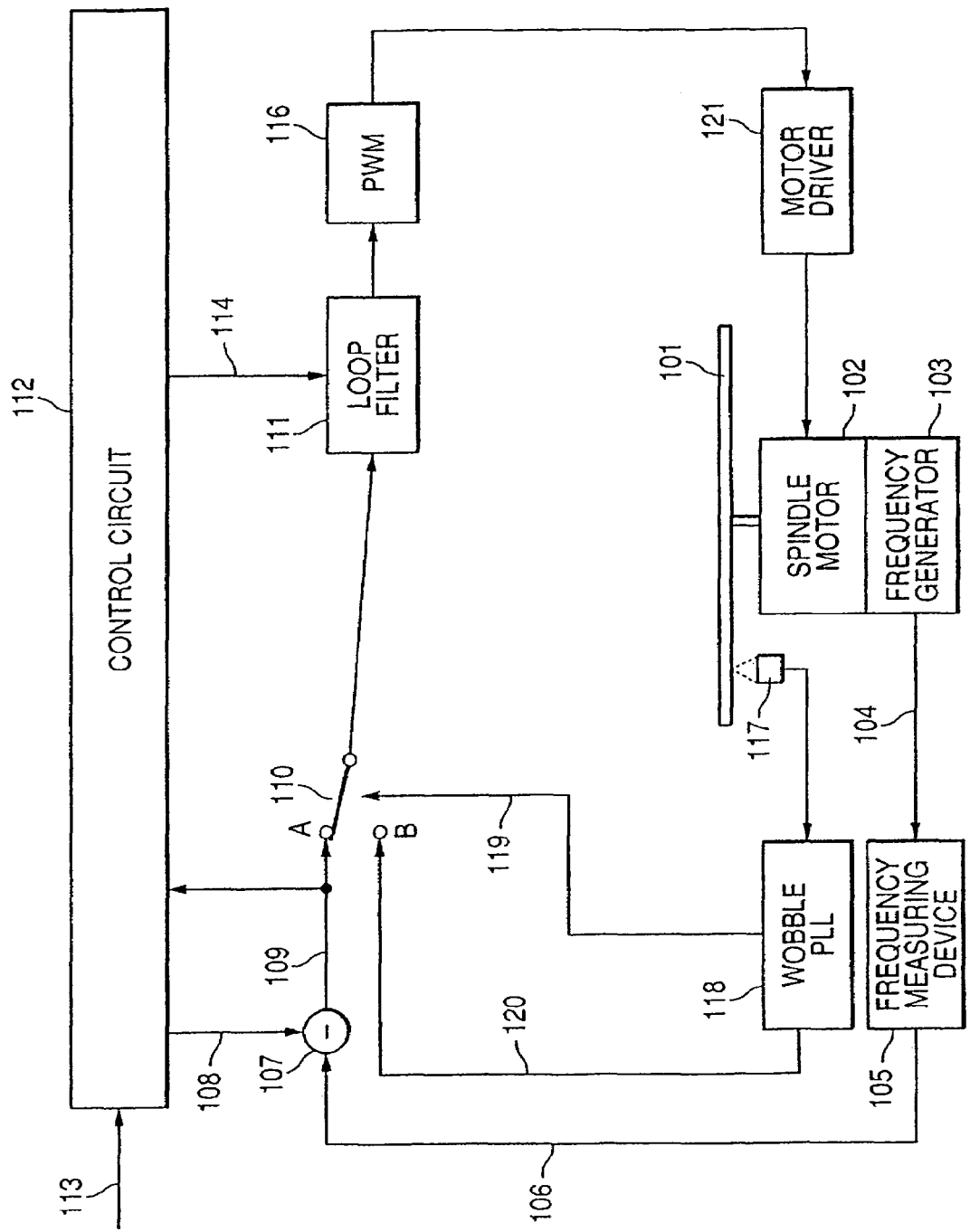
FIG. 1 is a block diagram showing a first embodiment of the present invention.
Figure 2:
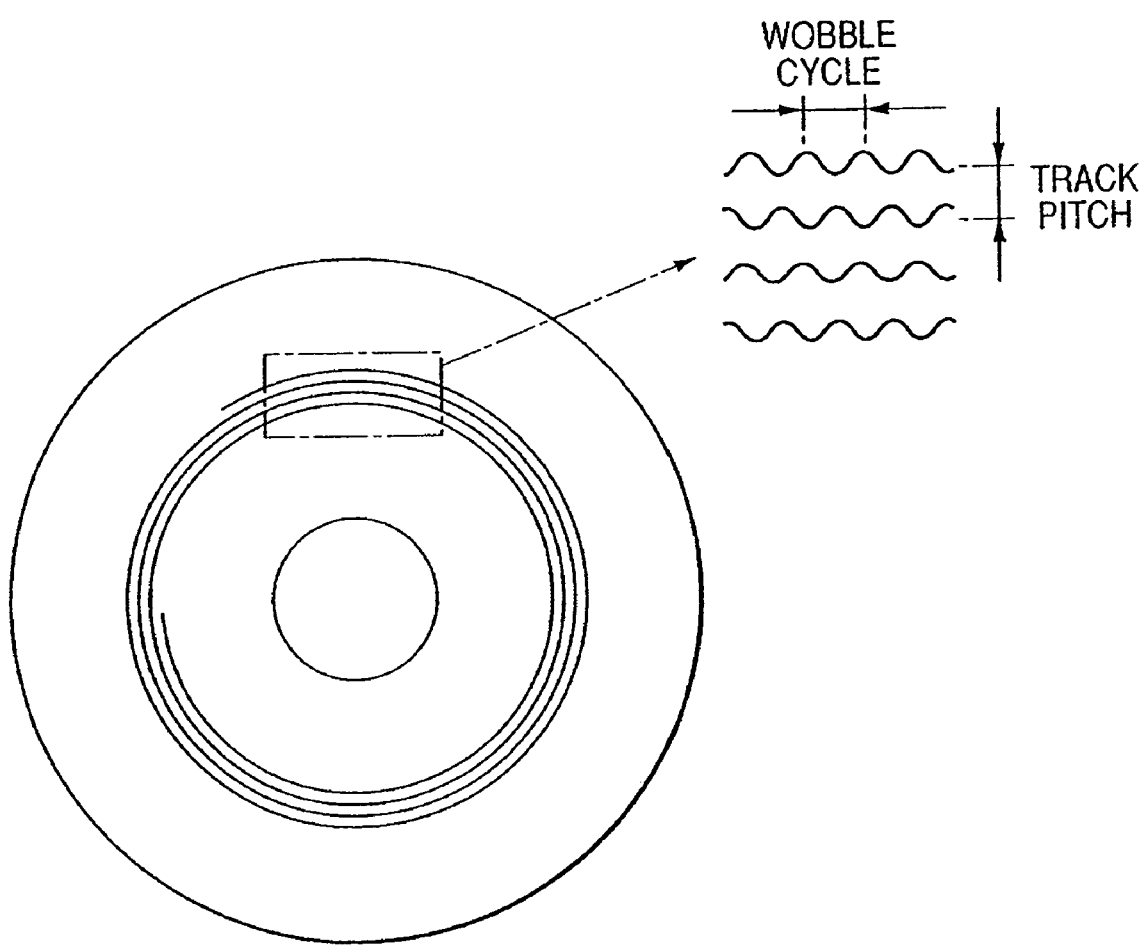
FIG. 2 is a plan view illustrating a wobble of an optical disk.

FIG. 1 is a block diagram showing a first embodiment of the information recording/reproducing apparatus according to the present invention. In FIG. 1, reference numeral 101 denotes an optical disk serving as an information recording medium, on which a wobble with a predetermined frequency is formed as shown in FIG. 2. Further, the optical disk 101 has a first recording layer and a second recording layer.

Figure 3A:
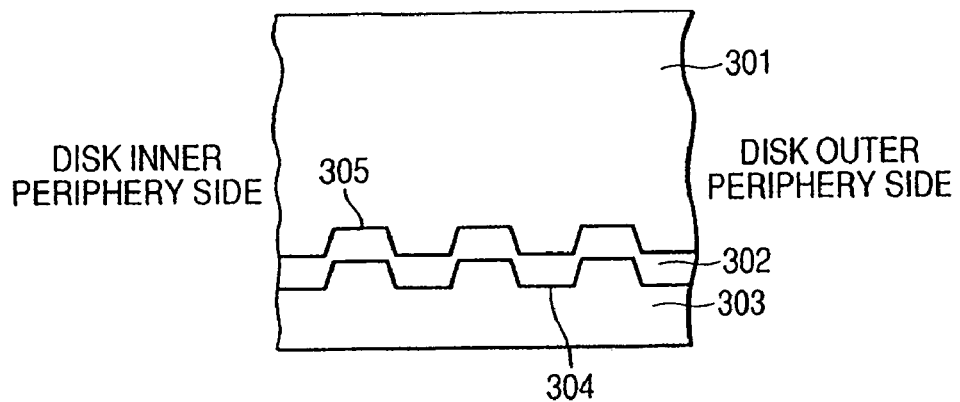
FIGS. 3A, 3B, and 3C are views illustrating recording layers of an optical disk.
Figure 3B:
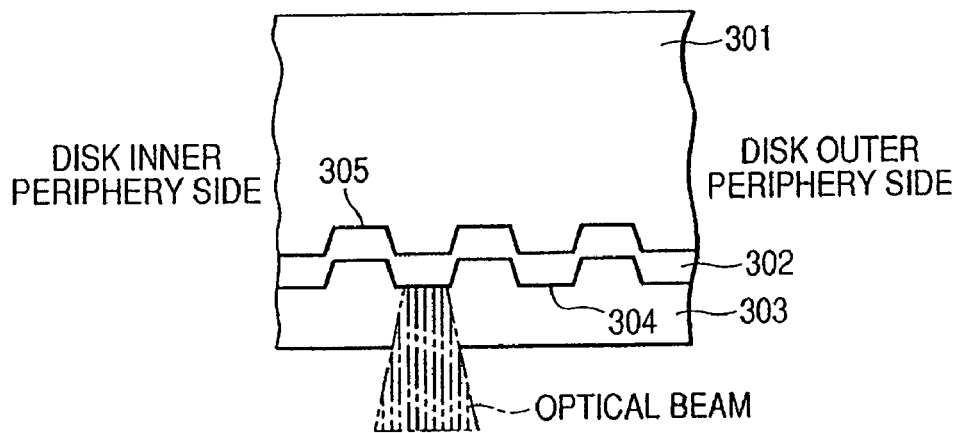
Figure 3C:
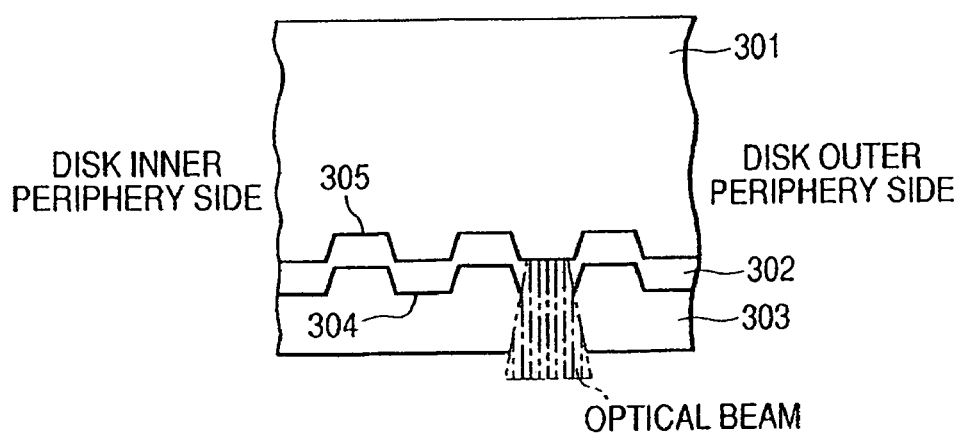

FIGS. 3A, 3B, and 3C are cross-sectional views of the optical disk. In FIG. 3A, reference numeral 301 denotes a disk substrate, 302 denotes an intermediate layer, 303 denotes a cover layer, 304 denotes a first recording layer, and 305 denotes a second recording layer. When recording or reproducing an information to or from the first recording layer 304, as shown in FIG. 3B, an optical beam is irradiated while being subjected to focusing control. When recording or reproducing an information to or from the second recording layer 305, as shown in FIG. 3C, an optical beam is irradiated while being subjected to focusing control.

Further reference numeral 102 denotes a spindle motor for rotating the optical disk 101. Reference numeral 103 denotes a frequency generator for generating a pulse signal having a frequency proportional to the rotation number of the spindle motor 102, and for outputting an FG pulse signal 104. Reference numeral 105 denotes a frequency measuring device for measuring the frequency of the FG pulse signal 104. A difference between a frequency value 106 from the frequency measuring device 105 and a desired value 108 outputted from the control circuit 112 is taken by a subtractor 107, and is outputted as a frequency error 109.

The desired value 108 is given in accordance with the radial position of an optical pickup 117 so that the linear velocity of the optical disk 101 becomes constant with respect to the optical pickup 117. In a case where A is selected by a switch 110, the frequency error 109 is inputted to a loop filter 111 and calculation is performed. The resultant frequency error 109 is sent to a pulse width modulation circuit (hereinafter referred to as PWM) 116 to be subjected to pulse width modulation. A PWM signal from the PWM 116 is sent to a motor driver 112 to drive the spindle motor 102.

The loop filter 111 is composed of an integrator, a low-pass filter, and the like as is well known in the art. The loop filter 111 performs filter calculation using an input signal and is operated with a loop filter calculation timing 114 from the control circuit 112.

Reference numeral 117 denotes the optical pickup for recording or reproducing an information to or from the optical disk 101. Reference numeral 118 denotes a wobble PLL for generating a clock which is synchronous with a wobble signal reproduced from the optical pickup 117. Reference numeral 119 denotes a signal indicating whether the wobble PLL 118 is in a locked state or in an unlocked state. The signal changes the switch 110 to B-side when the wobble PLL 118 is in a locked state, and changes the switch 110 to A-side when the wobble PLL 118 is in an unlocked state.

Reference numeral 120 denotes a rotation number information of the spindle motor 102 outputted from the wobble PLL 118. The rotation number information is outputted as zero when the wobble frequency is a predetermined frequency.

In a case where the wobble PLL 118 is in a locked state, the rotation number information 120 of the spindle motor 102 is inputted to the loop filter 111 and calculation is performed. Further, the rotation number information 120 is sent to the PWM 116 to be subjected to pulse width modulation. A PWM signal is sent to the motor driver 121 to drive the spindle motor 102. The loop filter 111 is operated with the loop filter calculation timing 114 from the control circuit 112.

As described above, the rotational control of the spindle motor 102 is switched between the rotational control by an FG pulse and the rotational control by a reproduced wobble signal, in accordance with the lock state of the wobble PLL 118. To be more specific, when the wobble PLL 118 is in an unlocked state, the spindle rotation control by the FG pulse signal is performed, and when the wobble PLL 118 is in a locked state, the spindle rotation control by the wobble signal is performed.

Next, an operation in a case where the optical pickup 117 changes a layer for recording/reproducing between the first recording layer and the second recording layer of an optical disk (hereinafter, simply referred to as "interlayer jumping") will be described. Reference numeral 113 in FIG. 1 denotes an interlayer jumping signal. The interlayer jumping signal becomes a high level when a focused focal point of an optical beam irradiated from the optical pickup jumps (or moves) between the first recording layer and the second recording layer. The operation of the control circuit 112 at that time will be described with reference to FIG. 4.

Figure 4:
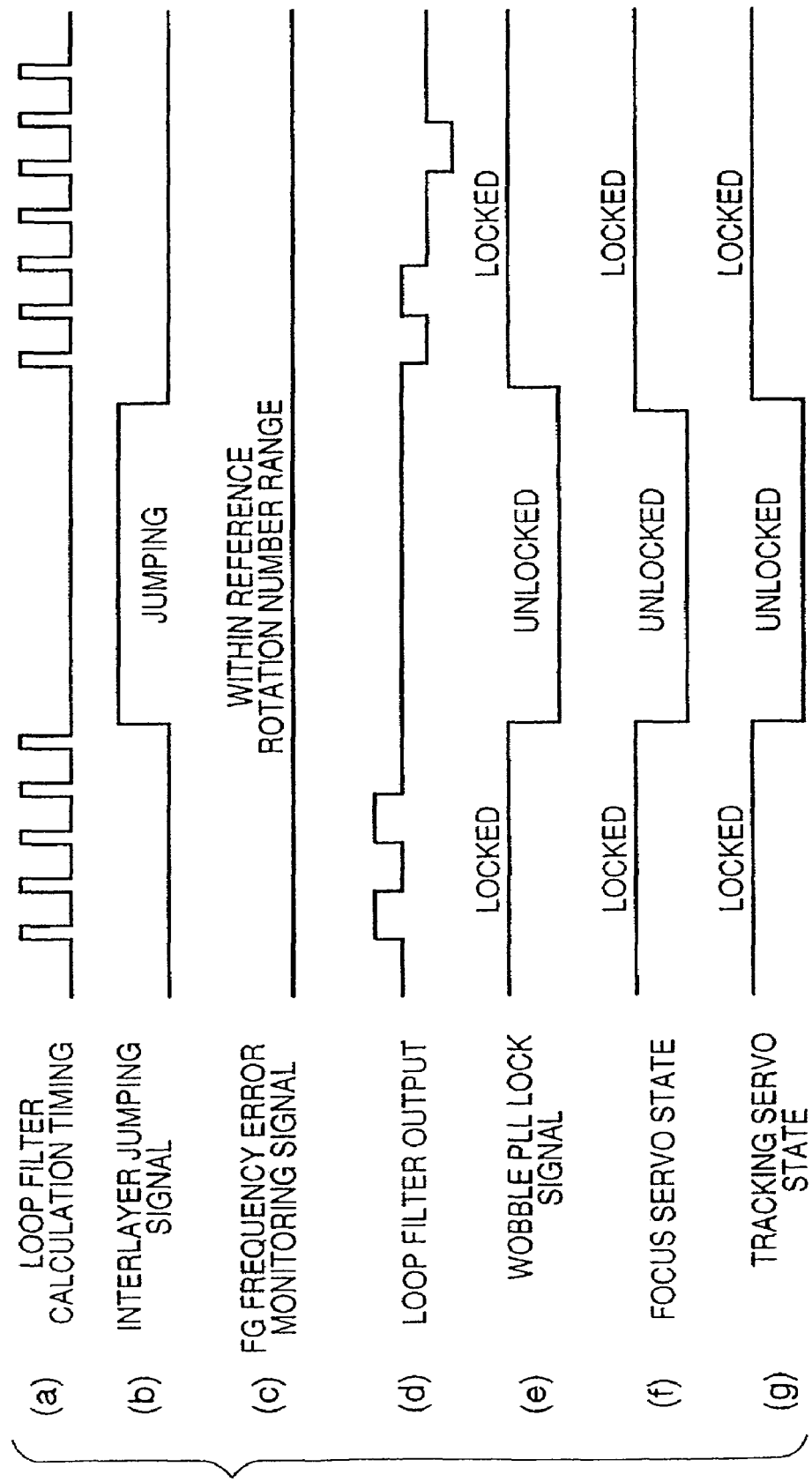
FIG. 4 is a timing chart illustrating an operation of the first embodiment.

In FIG. 4, (a) shows the calculation timing 114 of the loop filter 111, and (b) shows the interlayer jumping signal 113 which becomes the high level during the jumping between the layers. When the interlayer jumping signal 113 becomes the high level, the focus servo is turned off, so that the tracking servo is also turned off. Consequently, as shown in (f) and (g) of FIG. 4, the focus servo and the tracking servo are brought into an unlocked state. Further, since a wobble signal cannot be reproduced, the wobble PLL 118 is also brought into an unlocked state as shown in (e) of FIG. 4.

Therefore, the switch 110 is connected to the A side, and generally, spindle rotation control is performed with an FG pulse signal. However, when the interlayer jumping signal is at the high level, the control circuit 112 makes a control so that the loop filter calculation timing 114 is not outputted as shown in (a) of FIG. 4. Thus, as shown in (d) of FIG. 4, the calculation of the loop filter 111 stops, and the output before the interlayer jumping is held, whereby the drive voltage of the spindle motor 102 from the motor driver 121 is held in a state before the interlayer jumping.

When the interlayer jumping is completed, the focus servo is locked and the tracking servo is also locked to bring the interlayer jumping signal into a low level, and the loop filter calculation timing 114 is outputted again as shown in (a) of FIG. 4. The wobble PLL 118 has a wide loop bandwidth and is therefore brought into a locked state immediately, and the switch 110 is changed to the B-side, whereby the spindle rotation control based on a wobble signal is performed while the spindle rotation control based on an FG pulse signal is hardly performed. Within a short period of time, the loop bandwidth of the spindle rotation control based on an FG pulse signal is low, so that the rotational control is not affected.

Even if the rotation number of the spindle motor 102 changes largely and the wobble PLL 118 cannot be locked after the interlayer jumping, by holding the output in the state before the interlayer jumping, the switch 110 is changed to the A-side, whereby the spindle motor 102 is subjected to the rotational control by an FG pulse, so that no failure is caused.

However, in a case where the rotation number of the spindle motor 102 deviates largely from the lock range of the wobble PLL 118 during the interlayer jumping, it is desirable to perform the following control, which will be described with reference to FIG. 5.

Figure 5:
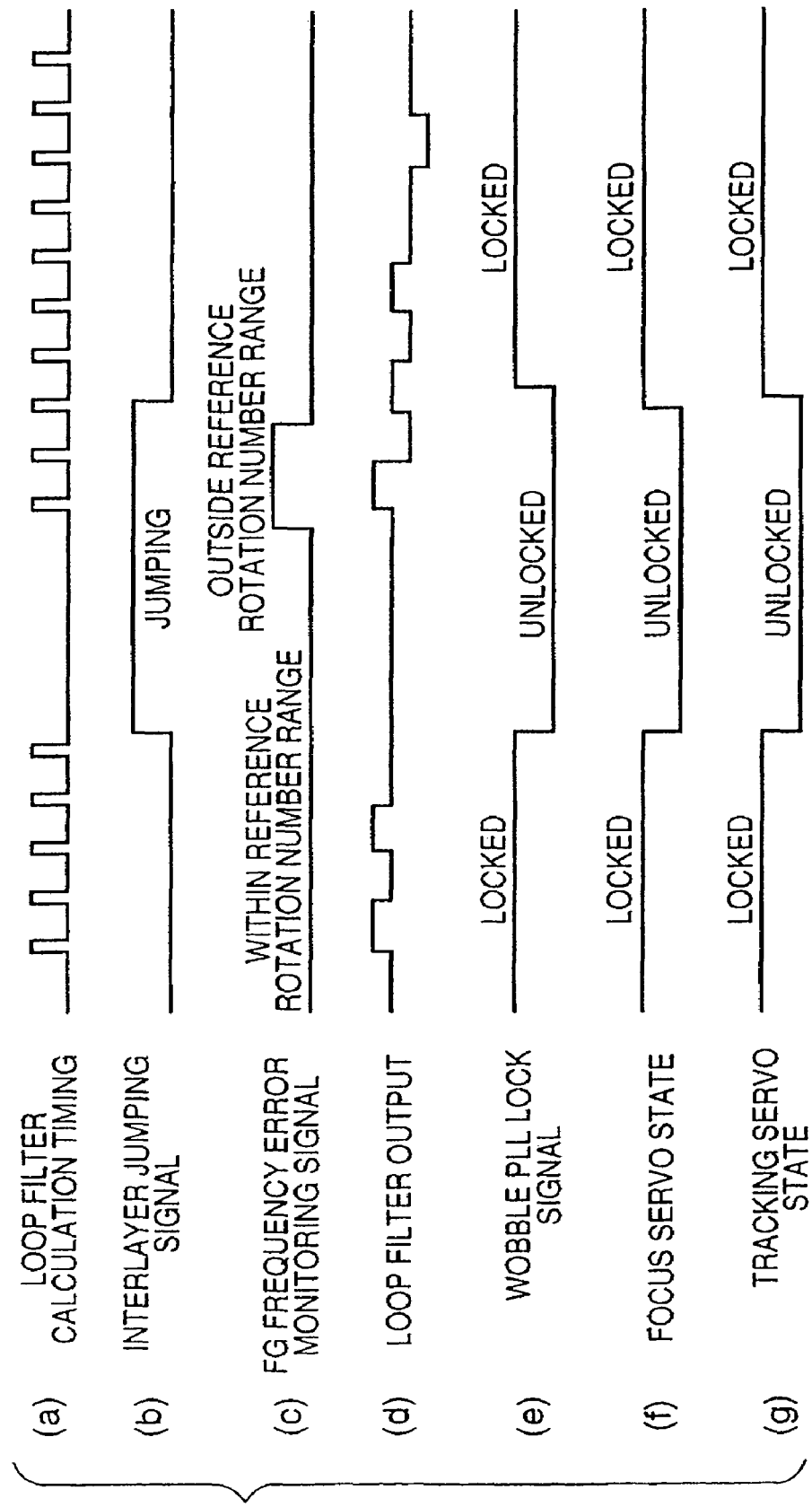
FIG. 5 is a timing chart illustrating a control in a case where the rotation number of a spindle motor deviates considerably from a lock range of a wobble PLL during the interlayer jumping of the first embodiment.

In FIG. 5, (c) shows an FG frequency error monitoring signal, which is generated such that when the frequency error 109 exceeds a predetermined range (a range larger than the lock range of the wobble PLL 118), there is made a judgment that the frequency error 109 is outside a reference rotation number range, in the control circuit 112. Incidentally, in (b) of FIG. 4, the FG frequency error monitoring signal is depicted to be within a reference rotation number range.

In a case where the FG frequency error monitoring signal indicates that the frequency error 109 is outside the reference rotation number range, the loop filter calculation timing 114 is outputted even during the interlayer jumping, and spindle rotation control based on an FG pulse signal is performed, as shown in (a) of FIG. 5. After that, when the interlayer jumping is completed and the wobble PLL 118 is locked, as shown in (e) of FIG. 5, spindle rotation control based on a wobble signal is performed again.

Second Embodiment

Figure 6:
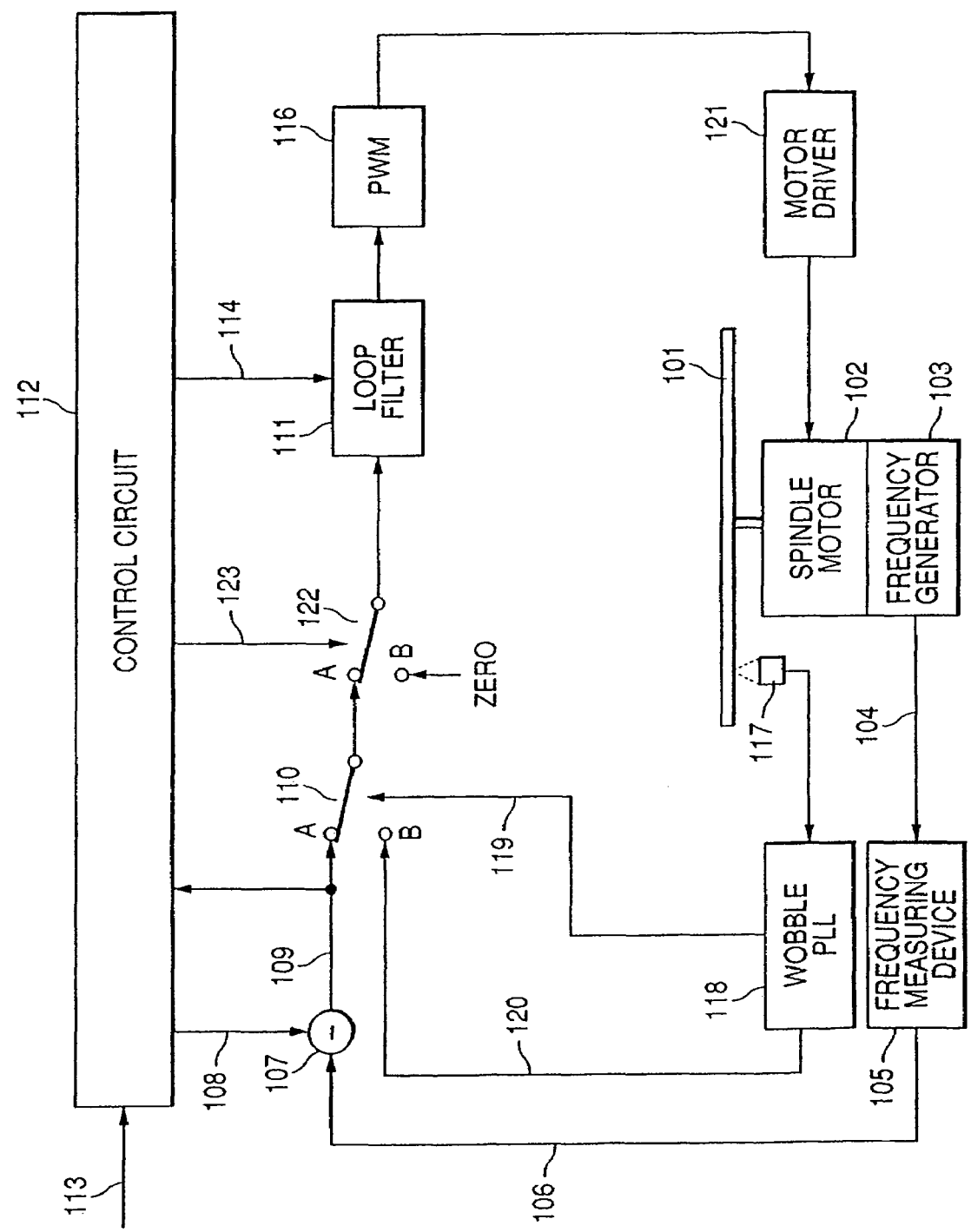
FIG. 6 is a block diagram showing a second embodiment of the present invention.

FIG. 6 is a block diagram showing a second embodiment of the present invention. In FIG. 6, same components as those in FIG. 1 are denoted by the same reference numerals. FIG. 6 is different from FIG. 1 in that a switch 122 is further provided.

In FIG. 6, reference numeral 101 denotes an optical disk, which is the same as that in the first embodiment. Reference numeral 102 denotes a spindle motor for rotating the optical disk 101. Reference numeral 103 denotes a frequency generator for generating a pulse signal having a frequency which is proportional to the rotation number of the spindle motor, and for outputting an FG pulse signal 104. Reference numeral 105 denotes a frequency measuring device for measuring the frequency of the FG pulse signal 104. A difference between the measured frequency 106 and a desired frequency value 108 outputted from a control circuit 112 is taken with a subtractor 107 and outputted as a frequency error 109.

The desired value 108 is given in accordance with the radial position of an optical pickup so that the linear velocity of the optical disk becomes constant with respect to the optical pickup. In a case where A is selected by a switch 110, and A is selected by a switch 122, the frequency error 109 is inputted to a loop filter 111 and calculation is performed. The resultant frequency error 109 is sent to a PWM 116 to be subjected to pulse width modulation. A PWM signal is sent to a motor driver 121 to drive the spindle motor 102. The loop filter 111 is operated with a loop filter calculation timing 114 from the control circuit 112.

Reference numeral 117 denotes an optical pickup. Reference numeral 118 denotes a wobble PLL for generating a clock which is synchronous with a wobble signal reproduced by the optical pickup 117. Reference numeral 119 denotes a signal indicating whether the wobble PLL 118 is in a locked state or in an unlocked state. The signal 119 changes the switch 110 to B-side when the wobble PLL 118 is in a locked state, and changes the switch 110 to A-side when the wobble PLL 118 is unlocked. When the wobble PLL 118 is in an unlocked state, the switch 112 is in a state in which A is selected.

Reference numeral 120 denotes a rotation number information of the spindle motor 102 outputted from the wobble PLL 118. The rotation number information is outputted as zero when the wobble frequency is a predetermined frequency. In a case where the wobble PLL 118 is in a locked state, the rotation number information 120 of the spindle motor 102 is inputted to the loop filter 111 to be subjected to calculation and then sent to the PWM 116 to be subjected to pulse width modulation. A PWM signal is sent to the motor driver 121 to drive the spindle motor 102. The loop filter 111 includes an integrator, a low-pass filter, and the like, and performs filter calculation based on an input signal, and operates at a loop filter calculation timing 114 from the control circuit 112.

As described above, the rotational control of the spindle motor 102 is switched between the rotational control by an FG pulse and the rotational control by a reproduced wobble signal, in accordance with the lock state of the wobble PLL 118. To be more specific, when the wobble PLL 118 is in an unlocked state, spindle rotation control by an FG pulse signal is performed, and when the wobble PLL 118 is in a locked state, spindle rotation control by a wobble signal is performed.

Next, an operation in a case where the optical pickup 117 changes a layer for recording/reproducing between the first recording layer and the second recording layer of an optical disk (interlayer jumping) will be described. Reference numeral 113 in FIG. 6 denotes an interlayer jumping signal. The interlayer jumping signal becomes a high level when a focused focal point of an optical beam irradiated from the optical pickup 117 jumps between the recording layers. Further, the control circuit 112 makes a control such that the switch 122 selects B in a case where the optical pickup 117 changes a layer for recording/reproducing between the first recording layer and the second recording layer of the optical disk, and selects A otherwise.

Figure 7:
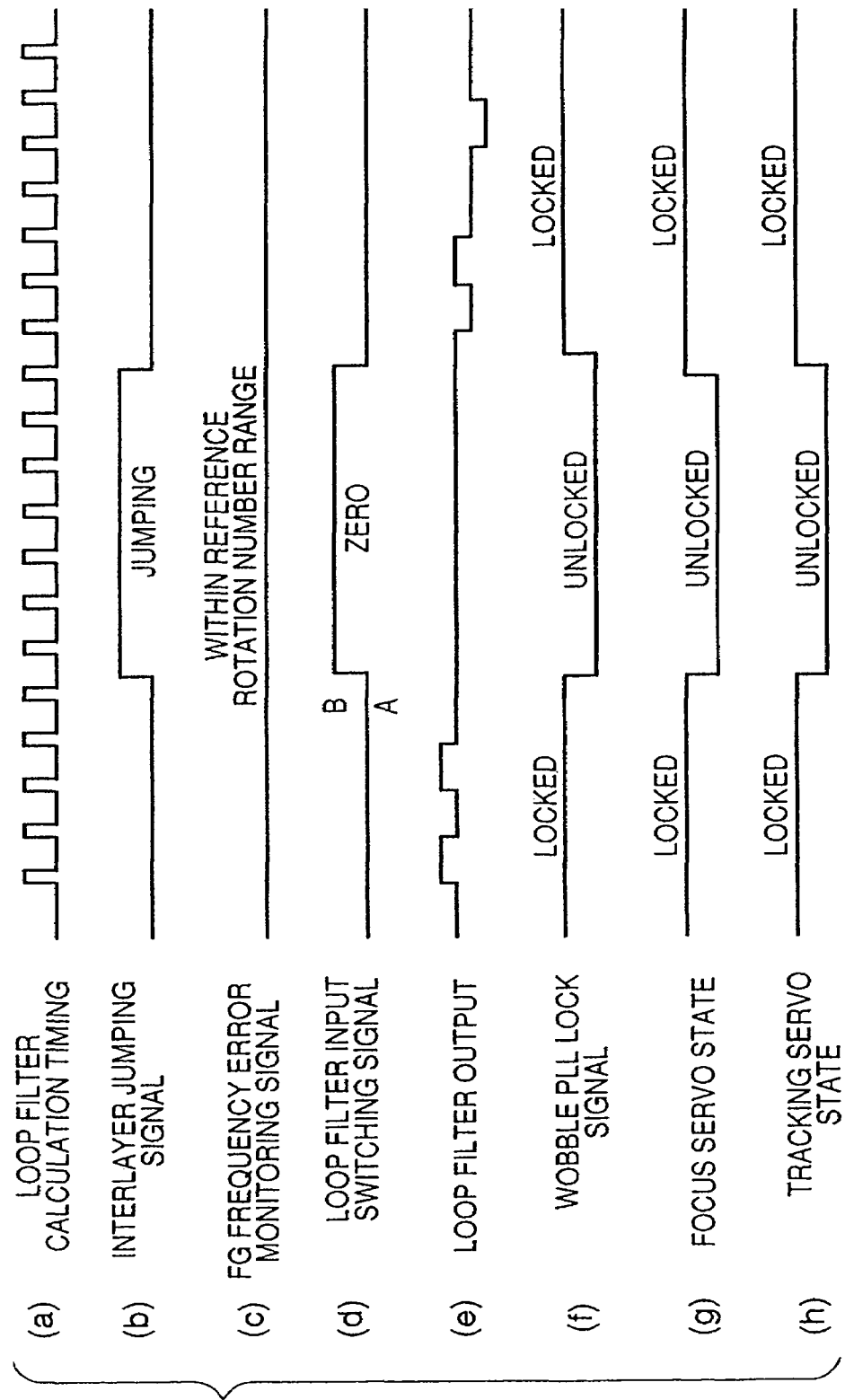
FIG. 7 is a timing chart illustrating an operation of the second embodiment.

The above-mentioned control will be described with reference to FIG. 7. In FIG. 7, (a) shows the loop filter calculation timing 114, and (b) shows the interlayer jumping signal which becomes a high level while a focused focal point of an optical beam irradiated from the optical pickup 117 jumps between the layers. When the interlayer jumping signal becomes the high level, the focus servo is turned off, so that the tracking servo is also turned off. Consequently, as shown in (g) and (h) of FIG. 7, the focus servo and the tracking servo are brought into an unlocked state. Further, since a wobble signal cannot be reproduced, the wobble PLL is also brought into an unlocked state as shown in (f) of FIG. 7.

Therefore, the switch 110 is connected to the A-side, and generally, spindle rotation control is performed based on an FG signal. However, since the interlayer jumping signal is at the high level (i.e. during jumping), the control circuit 112 makes a control so that the switch 122 selects B. Further, (d) of FIG. 7 shows a loop filter input switching signal 123 from the control circuit 112, and when the switch 122 selects B, the input of the loop filter 111 is set to be zero (no frequency error). Therefore, as shown in (e) of FIG. 7, the output of the loop filter 111 before the interlayer jumping is held, and the drive voltage of the spindle motor 102 is kept in the state before the jumping.

When the interlayer jumping is completed and the focus servo and the tracking servo are locked to bring the interlayer jumping signal into a low level, the switch 122 is connected to the A-side, and the frequency error 109 is inputted again to the loop filter 111, and the calculation of the loop filter 111 is started. The wobble PLL 118 has a wide loop bandwidth, so that the wobble PLL 118 is brought into a locked state immediately, and the switch 110 is changed to the B-side, whereby the spindle rotation control based on a wobble signal is performed while the spindle rotation control based on an FG pulse signal is hardly performed. Within a short period of time, the loop bandwidth of the spindle rotation control based on an FG pulse signal is low, so that the rotational control is not affected.

Even if the rotation number of the spindle motor 102 changes and the wobble PLL 118 cannot be locked after the interlayer jumping, by holding the output in the state before the interlayer jumping, the switch 110 is changed to the A-side, whereby the spindle motor 102 is subjected to the rotational control by an FG pulse, so that no failure is caused.

However, in a case where the rotation number of the spindle motor 102 deviates largely from the lock range of the wobble PLL 118 during the interlayer jumping, it is desirable to perform the following control, which will be described with reference to FIG. 8.

In FIG. 8, (c) shows an FG frequency error monitoring signal, which is generated such that when the frequency error 109 exceeds a predetermined range (a range wider than the lock range of the wobble PLL 118), there is made a judgment that the frequency error 109 is outside a reference rotation number range, in the control circuit 112. Incidentally, in (c) of FIG. 7, the FG frequency error monitoring signal is depicted to be within a reference rotation number range.

In a case where the FG frequency error monitoring signal indicates that the frequency error 109 is outside a reference rotation number range as shown in (c) of FIG. 8, the control circuit 112 makes a control so that the switch 122 selects A even during the interlayer jumping. Therefore, a frequency error is inputted to the loop filter 111, and spindle rotation control based on an FG pulse signal is performed. After that, when the interlayer jumping is completed and the wobble PLL 118 is locked, spindle rotation control based on a wobble signal is performed again.

In the above-mentioned embodiments, description has been made by taking as an example a two-layered optical disk having the first and the second recording layers. However, the present invention is not limited thereto and can also be applied to a case of using an optical disk having three or more recording layers.

This application claims priority from Japanese Patent Application No. 2005-200134 filed on Jul. 8, 2005, which is hereby incorporated by reference herein.

What is claimed is:

1. An information recording/reproducing apparatus for recording or reproducing information on or from an information recording medium having a plurality of recording layers stacked on a substrate, comprising:

an optical head for recording or reproducing information on or from the recording layers by use of an optical beam;

a spindle motor for rotating the recording medium; and a drive voltage holding circuit for holding a drive voltage of the spindle motor when the optical head performs switching between the recording layers for recording/reproducing, wherein a wobble for generating a clock is formed on the recording medium, and further comprising:

a frequency generator (FG) circuit for generating an FG signal of a frequency which is proportional to a rotation number of the spindle motor;

a wobble phase locked loop (PPL) circuit for outputting a clock which is synchronous with the wobble and a rotation number information of the spindle motor from a reproduced signal of the recording medium;

a lock detection circuit for detecting whether the wobble PLL circuit is in a locked state or in an unlocked state;

a spindle motor control circuit for controlling the rotation of the spindle motor based on an output from the FG circuit or the wobble PLL circuit; and a switching circuit for switching rotational control of the spindle motor control circuit to a control based on the output of the FG circuit in a case where the lock detection circuit detects an unlocked state of the wobble PLL circuit, and to a control based on an output of the wobble PLL circuit in a case where the lock detection circuit detects a locked state of the wobble PLL circuit;

wherein the spindle motor control circuit comprises a subtractor for taking a difference between a desired value and a rotational frequency value, and a loop filter for performing calculation based on an output of the subtractor, and wherein the drive voltage holding circuit holds the drive voltage of the spindle motor by stopping the calculation of the loop filter.

2. An information recording/reproducing apparatus, for recording or reproducing information on or from an information recording medium having a plurality of recording layers stacked on a substrate, comprising:

an optical head for recording or reproducing information on or from the recording layers by use of an optical beam;

a spindle motor for rotating the recording medium; and a drive voltage holding circuit for holding a drive voltage of the spindle motor when the optical head performs switching between the recording layers for recording/reproducing, wherein a wobble for generating a clock is formed on the recording medium, and further comprising:

a frequency generator (FG) circuit for generating an FG signal of a frequency which is proportional to a rotation number of the spindle motor;

a wobble phase locked loop (PPL) circuit for outputting a clock which is synchronous with the wobble and a rotation number information of the spindle motor from a reproduced signal of the recording medium;

a lock detection circuit for detecting whether the wobble PLL circuit is in a locked state or in an unlocked state;

a spindle motor control circuit for controlling the rotation of the spindle motor based on an output from the FG circuit or the wobble PLL circuit; and a switching circuit for switching rotational control of the spindle motor control circuit to a control based on the output of the FG circuit in a case where the lock detection circuit detects an unlocked state of the wobble PLL circuit, and to a control based on an output of the wobble PLL circuit in a case where the lock detection circuit detects a locked state of the wobble PLL circuit;

wherein the spindle motor control circuit comprises a subtractor for taking a difference between a desired value and a rotational frequency value, and a loop filter for performing calculation based on an output of the subtractor, and wherein the drive voltage holding circuit holds the drive voltage of the spindle motor by setting an input of the loop filter to be zero.

* * * * *